(12) United States Patent
Feroz et al.

(10) Patent No.: US 12,172,519 B2
(45) Date of Patent: Dec. 24, 2024

(54) OSCILLATING TORQUE STRATEGY FOR WHEEL DISCONNECT CLUTCH (71) Applicant: FORD GLOBAL TECHNOLOGIES, LLC, Dearborn, MI (US)

(72) Inventors: Zubair Feroz, Dearborn, MI (US); Abhinav Kumar, Canton, MI (US); Nithesh Maddi Reddy, Canton, MI (US); Rohit Ravindra Hippalgaonkar, Northville, MI (US); Matthew John Shelton, Grosse Ile, MI (US); Jose Velazquez Alcantar, Canton, MI (US); Oliver Legel, West Bloomfield, MI (US); Neil Hurst, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 315 days.

(21) Appl. No.: 17/743,586

(22) Filed: May 13, 2022

(65) Prior Publication Data
US 2023/0364990 A1 Nov. 16, 2023

(51) Int. Cl.
*B60W 10/02* (2006.01)
*B60K 17/02* (2006.01)
(Continued)

(52) U.S. Cl.
CPC .............. *B60K 23/08* (2013.01); *B60K 17/02* (2013.01); *B60K 17/356* (2013.01); *B60W 10/02* (2013.01);
(Continued)

(58) Field of Classification Search
CPC ...... B60K 23/08; B60K 17/02; B60K 17/356; B60K 17/354; B60K 2001/001; B60W 10/02; B60W 10/08; B60W 10/119; B60W 2510/0208; B60W 2510/081; B60W 2520/28; B60W 2710/021; B60W 2710/083; F16D 11/14; F16D 48/06;
(Continued)

(56) References Cited

U.S. PATENT DOCUMENTS 8,932,180 B2    1/2015   Hirawaki
9,037,326 B2    5/2015   Schaeffer et al.
(Continued)

FOREIGN PATENT DOCUMENTS

CN    111255824 A  *  6/2020  ............. F16D 48/06
JP    2014105845 A     6/2014
(Continued)

*Primary Examiner* — Tisha D Lewis
(74) *Attorney, Agent, or Firm* — Vincent Mastrogiacomo; Brooks Kushman.P.C.

(57) ABSTRACT

A vehicle includes a primary axle powered by an actuator and a secondary axle powered by a motor and including a wheel and a clutch selectively coupling the wheel to the motor via mating components. A controller is electrically connected to the clutch and the motor. The controller is programmed to, in response to an engagement of the clutch being unsuccessful within a first duration of time, command a series of speeds to the motor based on wheel speed and an alternating offset that changes between positive and negative signs at predefined periods so that relative speeds between the mating components oscillate due to the alternating offset to jiggle the clutch into engagement.

17 Claims, 4 Drawing Sheets

(51) Int. Cl.
　　*B60K 17/356*　　　(2006.01)
　　*B60K 23/08*　　　(2006.01)
　　*B60W 10/08*　　　(2006.01)
　　*B60W 10/119*　　(2012.01)
　　*F16D 11/14*　　　(2006.01)

(52) U.S. Cl.
　　CPC .......... *B60W 10/08* (2013.01); *B60W 10/119* (2013.01); *B60W 2510/0208* (2013.01); *B60W 2510/081* (2013.01); *B60W 2520/28* (2013.01); *B60W 2710/021* (2013.01); *B60W 2710/083* (2013.01); *F16D 11/14* (2013.01)

(58) Field of Classification Search
　　CPC . F16D 2500/10462; F16D 2500/30401; F16D 2500/3115; F16D 2500/70454; F16H 61/04; F16H 48/08; F16H 2061/047; B60L 15/2054; B60L 2240/421; B60L 2260/44
　　See application file for complete search history.

(56) References Cited

U.S. PATENT DOCUMENTS

| | | |
|---|---|---|
| 9,688,142 B2 | 6/2017 | Ogawa et al. |
| 2015/0167751 A1 | 6/2015 | Saieg et al. |
| 2021/0155219 A1* | 5/2021 | Alcantar ............... B60W 10/08 |

FOREIGN PATENT DOCUMENTS

| | | | |
|---|---|---|---|
| WO | WO-2018127635 A1 * | 7/2018 | ............... B60K 6/52 |
| WO | WO-2021214147 A1 * | 10/2021 | ............. B60K 6/448 |

* cited by examiner

OSCILLATING TORQUE STRATEGY FOR WHEEL DISCONNECT CLUTCH

TECHNICAL FIELD

The present disclosure relates to wheel disconnect clutches configured to disconnect a wheel hub from a shaft.

BACKGROUND

Automotive vehicles include a powertrain for propelling the vehicle. A conventional powertrain includes an engine coupled with a transmission. The driveshaft connects and output shaft of the transmission to a differential. The differential receives power and routes it to left and right driven wheels. The differential is connected to the wheels by a pair of halfshafts. Each of the halfshafts splines to a wheel-hub assembly that includes a wheel bearing supported within a knuckle connected to the vehicle suspension. The wheel-hub assembly includes a mounting plate with lugs configured to connect with the wheels. In this arrangement, the driven wheels are always connected to the powertrain.

Some vehicles include an all-wheel-drive system in which a primary drive axle is powered by a primary actuator and a secondary drive axle that is powered by a secondary actuator. The secondary actuator may be deenergized when not needed for vehicle propulsion, however, the actuator and other components of the secondary drive may continue to rotate creating spinning losses.

SUMMARY

According to one embodiment, a vehicle includes a primary axle powered by an actuator and a secondary axle powered by a motor and including a wheel and a clutch selectively coupling the wheel to the motor via mating components. A controller is electrically connected to the clutch and the motor. The controller is programmed to, in response to an engagement of the clutch being unsuccessful within a first duration of time, command a series of speeds to the motor based on wheel speed and an alternating offset that changes between positive and negative signs at predefined periods so that relative speeds between the mating components oscillate due to the alternating offset to jiggle the clutch into engagement.

According to another embodiment, a method of engaging a wheel-disconnect clutch includes, in response to an engagement of a wheel-disconnect clutch being unsuccessful within a duration of time, commanding a series of motor speeds based on wheel speed and an alternating offset that changes between positive and negative values at predefined periods so that relative speeds between engaging clutch components oscillate due to the alternating offset to jiggle the clutch into engagement.

According to another embodiment, a vehicle includes a primary axle powered by an actuator and a secondary axle powered by a motor, a wheel, and a clutch selectively coupling the wheel to the motor. A controller is electrically connected to the clutch and the motor. The controller is programmed to, in response to (i) a request to activate the secondary axle and (ii) a first speed difference between the wheel and the motor being less than a first threshold, command engagement of the clutch and command, for a first duration of time, a speed to the motor based on a speed of the wheel and a first offset; in response to the clutch engaging within the first duration of time, command a torque to the motor; in response to the clutch not engaging within the first duration of time, command, for a second duration of time, a second speed to the motor based on the speed of the wheel, the first offset, and a second offset; and, in response to the clutch engaging within the second duration of time, command a torque to the motor.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis or centerline is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, coupled, attached, etc., refer to directly or indirectly connected, coupled, attached, etc., unless otherwise indicated explicitly or by context.

Figure 1:
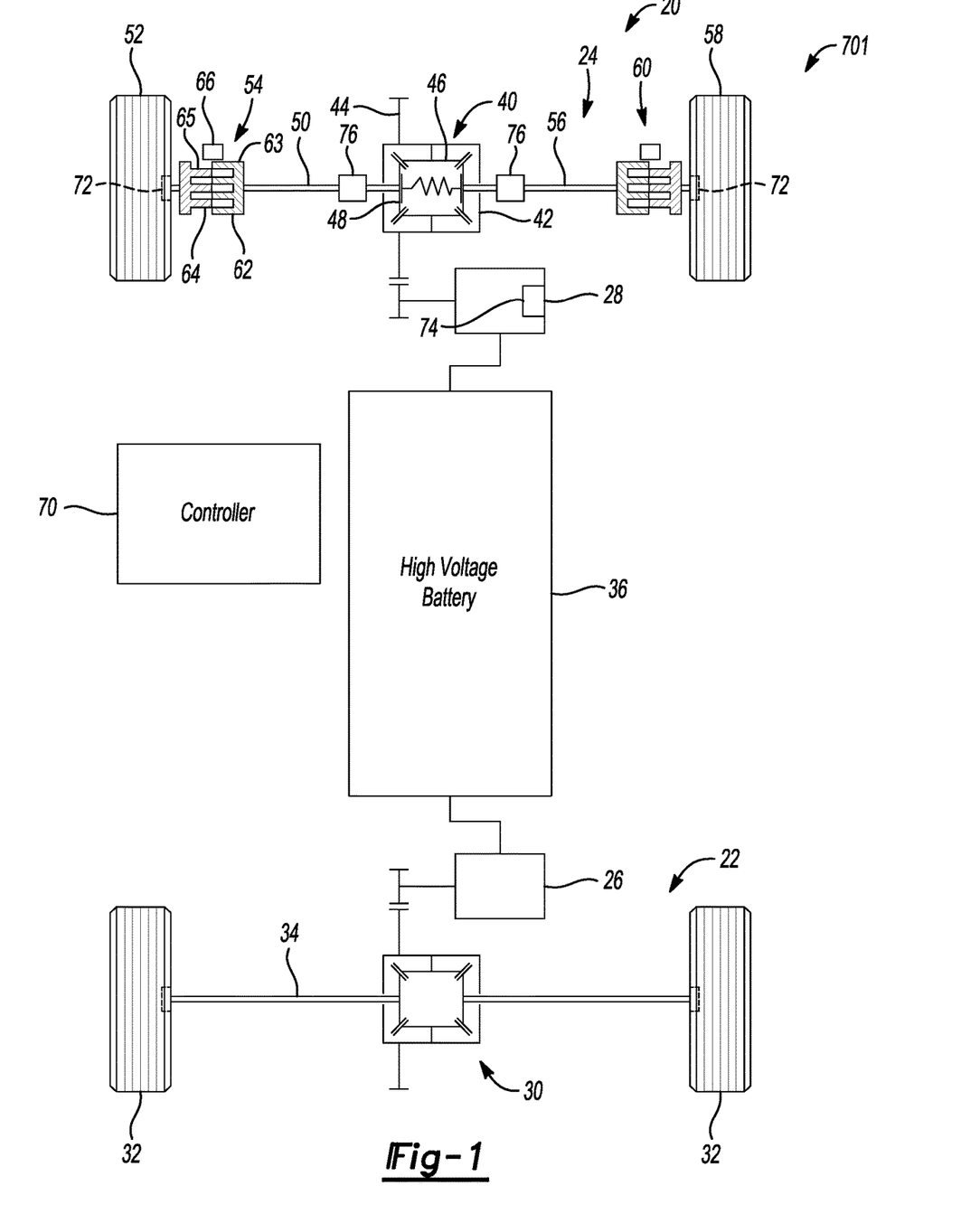
FIG. 1 is a schematic diagram of an electric vehicle having primary and secondary drive axles.

Referring to FIG. 1, an electrified vehicle 20 is illustrated according to an embodiment of the present disclosure. FIG. 1 illustrates representative relationships among the components. Physical placement and orientation of the components within the vehicle may vary. The vehicle 20 may be all-wheel drive and include a primary drive axle 22 and a secondary drive axle 24. The primary drive axle 22 may be the rear axle and the secondary drive axle 24 may be the front axle, or vice versa. The primary drive axle 22 is powered by a primary actuator 26, and the secondary axle 24 is powered by a secondary actuator 28. Example actuators include an internal-combustion engine and an electric motor. The motor may be implemented by a plurality of different types of electric machines. For example, the motor may be an alternating current, permanent magnet synchronous machine. The motor may be configured to operate as a motor to propel the vehicle and to operate as a generator to recapture energy such as during regenerative braking. In the illustrated configuration, both of the primary and secondary actuators 26, 28 are electric motors. In other embodiments, the primary actuator 26 may be an internal-combustion engine and the secondary actuator 28 may be a motor or vice versa. The motors 26, 28 are electrically connected to a high-voltage battery 36. Power electronics (not shown) condition direct current (DC) power provided by the battery 36 to the requirements of the motor 28. For example, the power electronics may provide three-phase AC to the motors. The power electronics are also configured to convert AC power generated by the motors to DC power to recharge the battery 36 such as during regenerative braking.

The primary motor 26 may be coupled to a differential 30. The differential 30 routes torque produced by the motor 26 to the driven wheels 32 via halfshafts 34. (Used herein "halfshaft" refers to any type of shaft that connects driven wheels to a drivetrain.) The differential 30 is configured to allow speed differences between the driven wheels to facilitate cornering of the vehicle. The differential 30 may be an open differential or a limited slip-differential.

Secondary axle 24 may also include a differential 40. The differential 40 includes a carrier 42 driveably connected to the secondary actuator 28 via gearing 44. The carrier 42 supports a pair of opposing spider gears 46 and a pair of opposing side gears 48 that mesh with the spider gears 46. Left and right halfshafts 50, 56 are connected to associated ones of the side gears 48. Used herein, "left" and "right" are from the vantage point of the driver seat looking forward. For example, the halfshafts may be splined to the side gears. The left halfshaft 50 is connected to the left wheel 52 by a left disconnect clutch 54, and the right halfshaft 56 is connected to the right wheel 58 by a right disconnect clutch 60. The disconnect clutches 54, 60 are disengageable to decouple the secondary axle 24 from the road when the secondary actuator 28 is not being used. This reduces spinning losses and can improve electric range and the like.

The clutches 54 and 60 may each include a first component 62 rotationally fixed (fixedly coupled) to the halfshaft and a second component 64 rotationally fixed (fixedly coupled) to the wheel. A group of rotating elements are fixedly coupled to one another if they are constrained to rotate as a unit in all operating conditions. Rotating elements can be fixedly coupled by spline connections, welding, press fitting, machining from a common solid, damper connections, or other means. Slight variations in rotational displacement between fixedly coupled elements can occur such as displacement due to lash or shaft compliance and damper oscillations. One or more rotating elements that are all fixedly coupled to one another may be called a shaft. In contrast, two rotating elements are selectively coupled when the elements are constrained to rotate in unison in a first condition and are free to rotate at unrelated speeds in one or more other conditions. For example, a clutch selectively couples two components by constraining them to rotate as a unit when fully engaged and permitting rotation at unrelated speeds when slipping or disengaged.

An engagement mechanism 66 is configured to rotationally couple and decouple the first and second components to engage and disengage the clutch. In one or more embodiments, the clutches 54, 60 are dog clutches that include intermeshing teeth, splines, cogs, or the like on the first and second components. For example, the component 62 includes first teeth 63 that mesh with second teeth 65 of the component 64.

The engagement mechanism 66 is electronically controlled by a controller 70. For example, the engagement mechanism may include a motor or solenoid the moves the teeth, cogs, or the like of the first and second components into engagement to lock (also known as engage or close) the clutch. While illustrated as one controller, the controller 70 may be one or more controllers. It should therefore be understood that the controller 70 and one or more other controllers can collectively be referred to as a "controller" that controls various actuators in response to signals/data from various sensors to control functions such as operating actuators 26, 28, the clutches 54, 60, and the power electronics. The controller 70 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 70 communicates with various sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by the controller 70 within each of the subsystems identified above. Representative examples of parameters, systems, and/or components that may be directly or indirectly actuated using control logic executed by the controller include battery charging, regenerative braking, lift-pedal torque, motor operation, clutch operation, and the like.

The vehicle 20 may include a plurality of sensors communicating input through the I/O interface. The sensors may be used to measure or infer wheel speeds, motor speed, vehicle speed, accelerator pedal position, brake pedal position, and halfshaft speed. For example, the wheels may include wheel speed sensors 72 configured to output data to the controller indicative of a rotational speed of the wheels. The motor 28 may include a resolver 74 that outputs signals indicative of motor speed to the controller 70. The halfshafts 50 and 56 may each include an associated speed sensor 76 (optional) configured to output data indicative of rotational speed. The speed sensors 76 are also in electronic communication with the controller 70. The speed sensors 76 may be disposed within the differential housing. The speed sensor 76 may measure the halfshafts or the side gears. The controller is programmed to register these individual speeds and to preform calculations using these speeds as inputs. For example, the controller may calculate average speeds of the wheels and the halfshafts.

The clutches 54, 60 may not include synchronization features; therefore, the speed difference between the halfshafts and their associated wheels must be small to produce smooth engagement of the clutches. The clutches 54, 60 are engaged by rotating the halfshafts with the motor 28 to have a substantial same speed as the wheels. Since the halfshafts are unloaded, the torque required to accelerate them to the desired speed is relatively low, and once the desired speed is achieved, the torque can be reduced to facilitate smooth clutch engagement. The motor 28 is incapable of independently rotating the halfshafts 50, 56 and instead can only affect an average speed of the halfshafts. This is not problematic during straight-line driving as each halfshaft should rotate at roughly the same speed. During cornering, however, the left and right halfshafts have different speeds. To overcome this, the controller 70 may be programmed to engage the clutches 54 and 60 at the same time when the speed difference between the left and right wheels 52, 58 is less than a threshold, i.e., the vehicle is driving straight, and to stagger engagement of the clutches 54, 60 when the vehicle is turning, i.e., the speed difference between the left and right wheels exceeds the threshold or to not engage the clutches while cornering.

The above-described electric vehicle is but one example embodiment and the vehicle may be conventionally powered, e.g., internal combustion engine, or a hybrid in other embodiments.

The electric machine 28 may be placed in speed control during the clutch engaging process. In speed control, the motor 28 is commanded to a target speed (as opposed to a torque) and closed loop controls, such as PI or PID, are used to reduce an error between the target speed and the measured (or inferred) motor speed. The target speed may be the speed of the wheel plus or minus an offset as will be explained in more detail below. It can be difficult to perfectly match the speeds between the electric machine and the wheel resulting in an un-satisfactory engagement of the clutch. To facilitate smooth engagement, an oscillating (jiggle) strategy may be employed to better align the clutch teeth. The oscillating strategy slightly varies the speed of the electric machine to bring the meshing gear teeth into better alignment. The oscillating strategy may be superimposed on top of a baseline command or strategy to create a back-and-forth motion between the meshing teeth.

Figure 2:
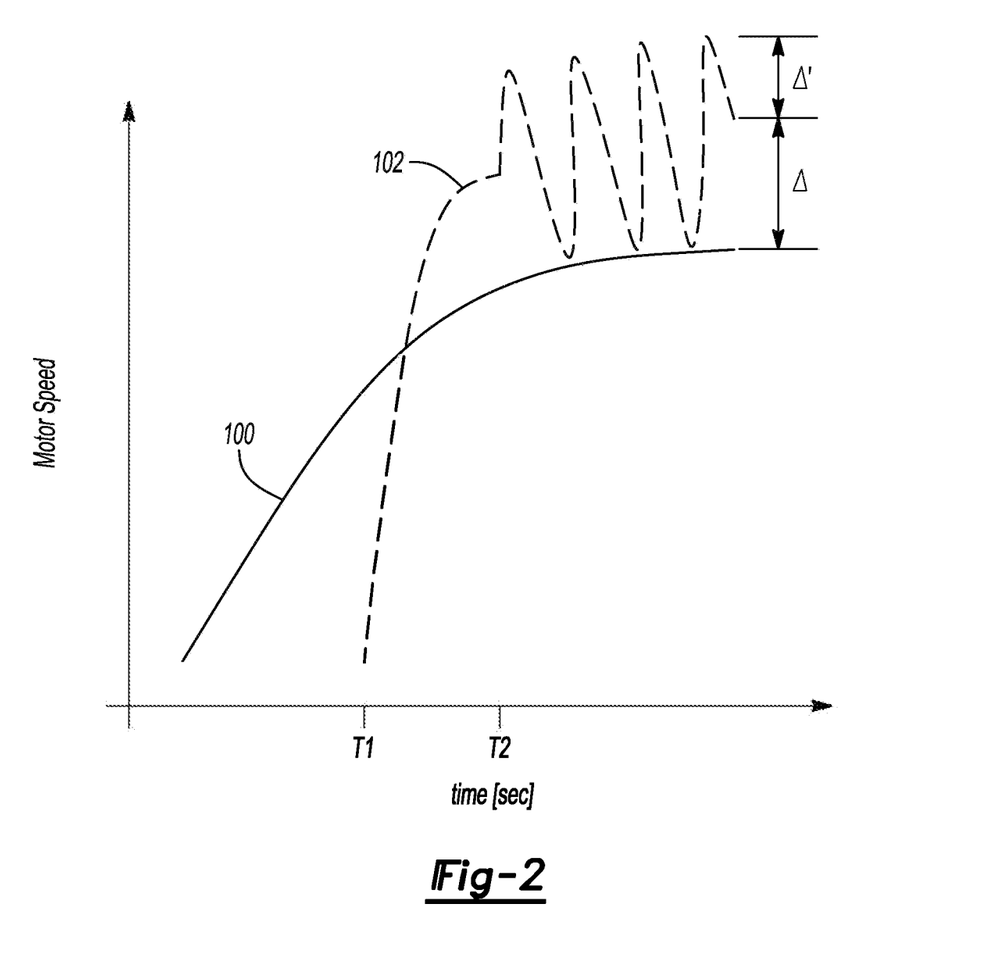
FIG. 2 shows plots of motor speed and wheel speed during a clutch engagement.

FIG. 2 illustrates an example clutch engagement using the oscillating strategy, e.g., shifting the vehicle from two-wheel drive to four-wheel drive. In this example, the secondary axle is inactive prior to time T1. At time T1, the controller receives a command to activate the secondary axle 24. The secondary axle 24 is activated by energizing the secondary motor 28 and engaging (locking) the clutches 54, 60. In this example, the vehicle is accelerating. In response to receiving the activation signal, the controller 70 stops motor torque control and commands the motor 28 to speed control. (The motor is normally in torque control.) In speed control, the motor 28 is commanded to a target speed and closed loop controls are used to reduce an error between the target speed and the current motor speed. Here, the target is based on the speed wheel (trace 100) and motor speed is shown by trace 102. The target may be the wheel speed modified by an offset Δ that is calibratable during testing. In this example, the offset is positive so that the motor speed 102 exceeds the wheel speed 100. The offset may be positive when the vehicle is accelerating and may be negative when the vehicle is decelerating.

At time T2, the oscillating strategy commences. During the oscillating strategy, an additional oscillating offset Δ' is added on top of the fixed-sign offset Δ to periodically increase and decrease the speed difference between the wheel speed 100 (first clutch component 64) and the electric machine speed 102 (second clutch component 62). The oscillating offset may be added and subtracted from the fixed offset to arrive at the commanded motor speed 102. This changes the relative speeds between motor speed 100 and the wheel speed 102 to jiggle the clutch components into engagement. The jiggling effect varies the speed across the two sides of the clutch so that the teeth free themselves in the event they become bound. This solution does not necessarily require zeroing out the torque at the two sides of the clutch. Multiple speed profiles could be used for the oscillating strategy.

While not shown, the oscillating strategy may also be used when disconnecting the clutch, i.e., shifting the vehicle from four-wheel drive to two-wheel drive.

Control logic or functions performed by controller 70 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 70. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 3A:
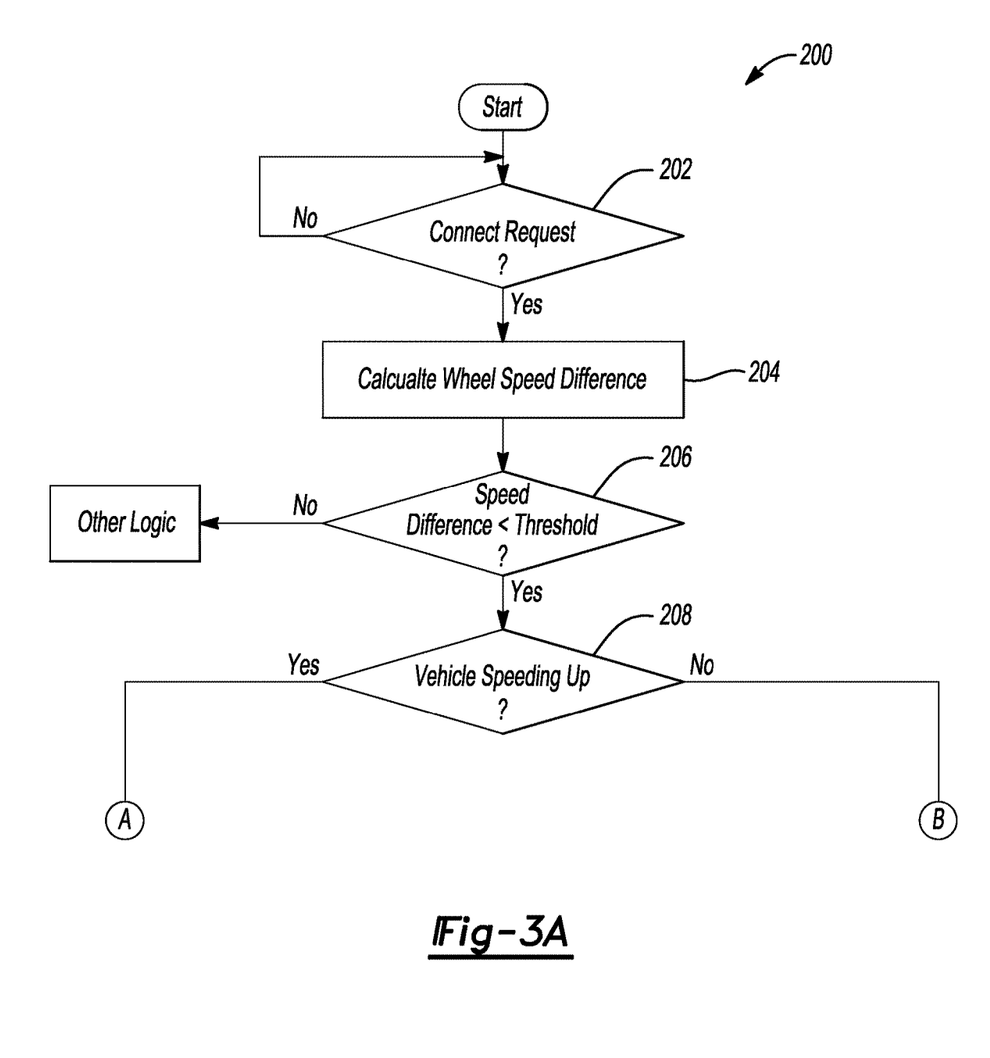
FIGS. 3A-3B illustrates an algorithm for controlling a vehicle powertrain during engagement of a clutch.
Figure 3B:
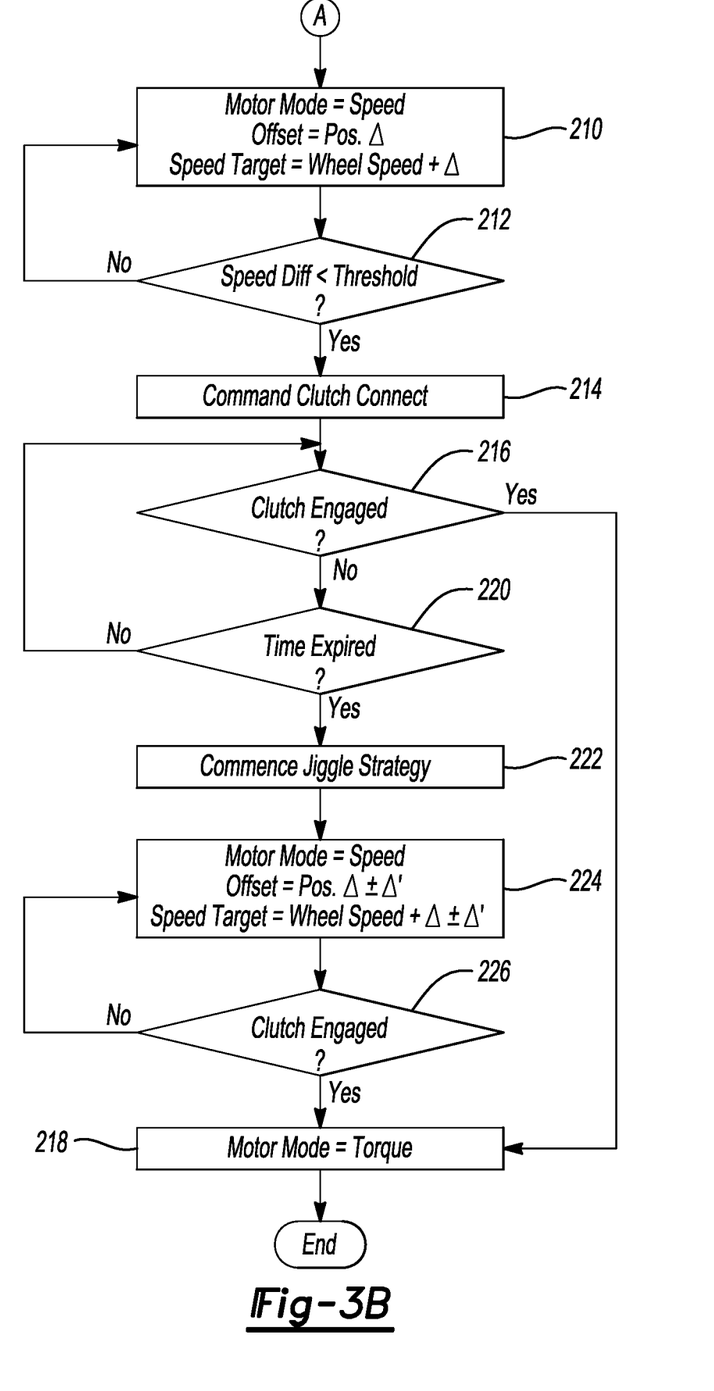

FIGS. 3A-3B illustrate an example flow chart 200 of an algorithm for controlling activation of the secondary axle 24. Control begins at operation 202 when the controller receives a request to activate the secondary axle. Control then passes to operation 204 where the controller calculates a wheel speed difference between the left and right wheels. Operation 206 determines if the speed difference between the wheels exceeds a threshold, which indicates that the vehicle is turning by a threshold amount. If the vehicle is not turning, i.e., the speed difference is less than the threshold, control passes to operation 208. If the threshold is exceeded, then other logic is used. Example other logic is disclosed in Applicant's application number U.S. Ser. No. 16/698,006, filed Nov. 27, 2019, the contents of which are hereby incorporated by reference herein.

At operation 208, the controller determines if the vehicle is speeding up or slowing down as different offsets may be applied in these different situations. A positive offset may be used during acceleration and a negative offset may be used during deceleration. If the vehicle is speeding up control passes to operation 210, where the motor mode is set to speed control, the offset is assigned as a positive offset and the target motor speed is based on the wheel speed and the offset, e.g., the speed target is equal to the wheel speed plus the positive offset. This offset may be called a fixed offset as the sign does not change and may not be a dynamic value. At operation 212, the controller determines if the speed difference between the motor speed and the wheel speed is less than a threshold. If yes, the clutch can be connected, and this is commanded at operation 214. If no, the motor remains in speed control in order to synchronize the motor and wheel speeds so that the clutch can be closed.

At operation 214, the controller sends an electric signal to the clutch actuator to engage the first component of the clutch that is fixedly coupled to the motor and the second component of the clutch that is fixedly coupled to the wheel. Generally, when the speed difference is less than the threshold, the teeth, splines, or the like of the first and second clutch components are able to engage thus locking the clutch.

At operation 216, the controller determines if the clutch has fully engaged successfully. If yes, the motor is commanded to torque-control mode at operation 218 and the shift from two-wheel drive to four-wheel drive is complete.

If the clutch has not engaged at operation 216, control passes to operation 220 where the run time of the clutch-connect command is compared to a timer. If the timer has not expired, the controller continues to attempt clutch engagement. If the clutch does not engage within the threshold time, the oscillation (jiggle) strategy is commenced at operation 222.

As described above, the oscillation strategy creates oscillations between the first and second clutch components to further facilitate meshing. At operation 224, the motor is commanded to speed control (or remains in speed control) and the overall offset is set to the positive offset (may be the same offset as step 210) plus or minus an additional offset (oscillating offset Δ'). That is, the overall offset during the jiggle strategy may be the baseline offset that is added to or subtracted by the second offset. The oscillating offset Δ' periodically switches between positive and negative sign at predefined periods to create the oscillating effect. The predefined period may be based on a processing speed of the controller. For example, the oscillating offset Δ' may switch signs each loop of the control cycle. Alternatively, the oscillating offset Δ' may switch signs every two, three, four, etc. loops of the control cycle. Changing the predetermined time affects the frequency of the oscillations and can be tuned to best match the hardware associated with the vehicle. Following commencement of the jiggle strategy, the controller again attempts to (or has been continuously attempting to) engage the clutch. At operation 226, the controller checks if the clutch has successfully engaged. If yes, the shift is successful, and control passes to operation 218 where the motor is commanded to torque control.

A vehicle may include more than a single clutch, typically to clutches, and the controls 200 may be used to engage both of these clutches. The strategy 200 may be operated in parallel for each of the clutches to engage both at the same time.

If the vehicle is determined to be slowing down at operation 208, strategy B is used. Strategy B may be the same as strategy A except that the fixed offset (e.g., step 210) has a negative value so that the motor speed is less than the wheel speed. The remaining portions of strategy A may be the same as strategy B and will not be described again for brevity.

While the controls 200 specifically relate to the engagement of the clutch, i.e., a request to shift from two-wheel drive to four-wheel drive, similar controls may be used to shift the vehicle from four-wheel drive to two-wheel drive, i.e., disengage the clutch. The controls for disengaging the clutch may be similar or the same as those described in control strategy 200 with the exception of operations 214, 216, and 226. During a disengagement routine, operation 214 is replaced with a command to disengage the clutch and operations 216 and 222 are replaced with determining that the clutch has disengaged.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a primary axle powered by an actuator;
   a secondary axle powered by a motor and including a wheel and a clutch selectively coupling the wheel to the motor via mating components; and
   a controller electrically connected to the clutch and the motor and programmed to:
   in response to an engagement of the clutch being unsuccessful within a first duration of time, command a series of speeds to the motor based on wheel speed and an alternating offset that changes between positive and negative signs at predefined periods so that relative speeds between the mating components oscillate due to the alternating offset to jiggle the clutch into engagement, wherein the series of speeds are further based on a fixed offset that has a positive value when the vehicle is accelerating and has a negative value when the vehicle is decelerating.

2. The vehicle of claim 1, wherein the clutch is a dog clutch.

3. The vehicle of claim 1, wherein the clutch includes a first component fixedly coupled to the motor and a second component fixedly coupled to the wheel, wherein the first and second components are configured to mechanically interlock.

4. The vehicle of claim 1, wherein the predefined period is based on a processing speed of the controller.

5. The vehicle of claim 4, wherein the predefined period is a cycle time of the controller.

6. The vehicle of claim 1, wherein the controller is further programmed to, in response to the clutch engaging, cease commanding the series of speeds and command a torque to the motor.

7. The vehicle of claim 1, wherein the clutch does not include a synchronizer.

8. A method of engaging a wheel-disconnect clutch comprising:
in response to an engagement of a wheel-disconnect clutch being unsuccessful within a duration of time, commanding a series of motor speeds based on wheel speed and an alternating offset that changes between positive and negative values at predefined periods so that relative speeds between engaging clutch components oscillate due to the alternating offset to jiggle the clutch into engagement, wherein the series of speeds are further based on a fixed offset that has a positive value when the vehicle is accelerating and has a negative value when the vehicle is decelerating.

9. The method of claim 8 further comprising commanding engagement of the clutch for a first duration of time, wherein the series of motor speeds are commanded subsequent to expiration of the first duration of time.

10. The method of claim 8, wherein the predefined period is based on a processing speed of a controller associated with the wheel-disconnect clutch.

11. The method of claim 8 further comprising, in response to the clutch engaging, ceasing to command the series of speeds and commanding a torque to the motor.

12. The method of claim 8 further comprising, in response to a disengagement of the wheel-disconnect clutch being unsuccessful within a duration of time, commanding a series of motor speeds based on wheel speed and an alternating offset that changes between positive and negative values at predefined periods so that relative speeds between engaging clutch components oscillate due to the alternating offset to jiggle the clutch into disengagement.

13. A vehicle comprising:
a primary axle powered by an actuator;
a secondary axle powered by a motor, a wheel, and a clutch selectively coupling the wheel to the motor; and
a controller electrically connected to the clutch and the motor and programmed to:
in response to (i) a request to activate the secondary axle and (ii) a first speed difference between the wheel and the motor being less than a first threshold, command engagement of the clutch and command, for a first duration of time, a speed to the motor based on a speed of the wheel and a first offset,
in response to the clutch engaging within the first duration of time, command a torque to the motor, and
in response to the clutch not engaging within the first duration of time, command, for a second duration of time, a second speed to the motor based on the speed of the wheel, the first offset, and a second offset, and
in response to the clutch engaging within the second duration of time, command a torque to the motor.

14. The vehicle of claim 13, wherein the first offset is fixed.

15. The vehicle of claim 13, wherein the second offset alternates between positive and negative values according to a predefined period so that relative speeds between engaging clutch components oscillate to jiggle the clutch into engagement.

16. The vehicle of claim 13, wherein the first offset has a positive value when the vehicle is accelerating and has a negative value when the vehicle is decelerating.

17. The vehicle of claim 13, wherein the clutch is a dog clutch.

\* \* \* \* \*